(12) United States Patent
Reid

(10) Patent No.: US 7,246,135 B2
(45) Date of Patent: Jul. 17, 2007

(54) SHARING CLASSES BETWEEN PROGRAMS

(75) Inventor: John L. Reid, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 09/756,579

(22) Filed: Jan. 8, 2001

(65) Prior Publication Data

US 2002/0091867 A1 Jul. 11, 2002

(51) Int. Cl.
*G06F 9/445* (2006.01)
*G06F 9/54* (2006.01)

(52) U.S. Cl. .................. 707/103 Z; 718/102; 719/328; 719/312

(58) Field of Classification Search ........ 719/310–332; 718/1–108; 707/103
See application file for complete search history.

(56) References Cited

U.S. PATENT DOCUMENTS

| | | | |
|---|---|---|---|
| 5,737,605 A * | 4/1998 | Cunningham et al. ...... | 719/312 |
| 6,519,594 B1 * | 2/2003 | Li ............................... | 707/10 |
| 6,557,168 B1 * | 4/2003 | Czajkowski ................ | 717/151 |
| 6,567,974 B1 * | 5/2003 | Czajkowski ................ | 717/151 |
| 6,629,153 B1 * | 9/2003 | Gupta et al. ................ | 719/316 |
| 6,694,346 B1 * | 2/2004 | Aman et al. ................ | 718/104 |
| 6,738,977 B1 * | 5/2004 | Berry et al. ................ | 719/332 |
| 6,813,522 B1 * | 11/2004 | Schwarm et al. ............... | 700/5 |
| 6,829,761 B1 * | 12/2004 | Sexton et al. ................ | 717/165 |
| 2002/0133527 A1 * | 9/2002 | Daynes et al. .............. | 709/100 |
| 2004/0015921 A1 * | 1/2004 | Daynes et al. .............. | 717/153 |

FOREIGN PATENT DOCUMENTS

| | | | |
|---|---|---|---|
| JP | 10207709 A | * | 8/1998 |
| JP | 10320203 A | * | 12/1998 |
| JP | 11039208 A | * | 2/1999 |
| WO | WO 0052572 | * | 9/2000 |

OTHER PUBLICATIONS

Chappell, David. "Understanding ActiveX and OLE". Microsoft Press. 1996.*
Meyer, Bertrand. "Object-oriented Software Construction." Prentice Hall, 1988, pp. 74-88.*
Microsoft Press. "Microsoft Computer Dictionary, Fourth Edition." 1999, p. 406.*
Czajkowski, Grzegorz. "Application Isolation in the Java Virtual Machine." ACM. Oct. 2000.*
Czajkowski, Grzegorz et al. "JRes: A Resource Accounting Interface for Java." ACM. Oct. 1998.*
Ott, Robert. "Simple Shared Object, An Architectural Pattern for Simple Object Sharing." Version 1.0-2. Mar. 1, 1996.*

(Continued)

*Primary Examiner*—Lewis A. Bullock, Jr.
(74) *Attorney, Agent, or Firm*—Trop, Pruner & Hu, P.C.

(57) ABSTRACT

Two applications running on the same or different processor-based systems may share a class. In some embodiments, the shared class may be shared out of shared memory. In addition, the object defined member data that is process specific may be duplicated in the address space of each program that uses the object.

17 Claims, 3 Drawing Sheets

OTHER PUBLICATIONS

Microsoft Press. "Microsoft, Computer Dicationary." Fourth Edition, 1999. pp. 211-212.*

"Building a Java virtual machine for server applications: The Jvm on OS/390". IBM Corporation. Sep. 10, 1999.*

Czajkowski, Grzegorz. "Multiprocessing and Portability for PDA's". Sun Microsystems Laboratories. Sep. 17-20, 2000.*

IBM Technical Disclosure Bulletin. "Handling Shared Objects in Multi-Process Systems." Dec. 1, 1995.*

* cited by examiner

SHARING CLASSES BETWEEN PROGRAMS

BACKGROUND

This invention relates generally to processor-based systems and particularly to the ability to share a class between two applications or programs.

A class, in object-oriented programming, refers to a group of smaller objects. Each object is defined by its data and the operations that can be performed on its data. These operations are the object's interface.

It is common for two software programs running on the same computer system to communicate and share data. Modern operating systems provide various low-level mechanisms to support data sharing between applications running on the same computer. Unfortunately, these mechanisms generally involve procedure-based access to shared memory. Since a large percentage of modern software projects are developed using object-oriented programming languages and object-oriented paradigms, these operating system supported mechanisms may be awkward and complex to implement, test and maintain when applied with object-oriented programming languages.

On Windows operating systems, one solution is the component object model or COM. While COM provides an object-oriented way to communicate and share data across the boundaries of a program's address space, COM also involves substantial overhead. This overhead comes in the form of both a steep learning curve for developers and in the form of run-time overhead needed to install all the features COM publishes, whether or not the program actually uses those features. This has implications on the amount of resources a program uses, its performance, debug complexity, maintenance and modifiability.

Thus, there is a need for better ways to enable application programs to communicate and share data in an object-oriented fashion.

DETAILED DESCRIPTION

Figure 1:
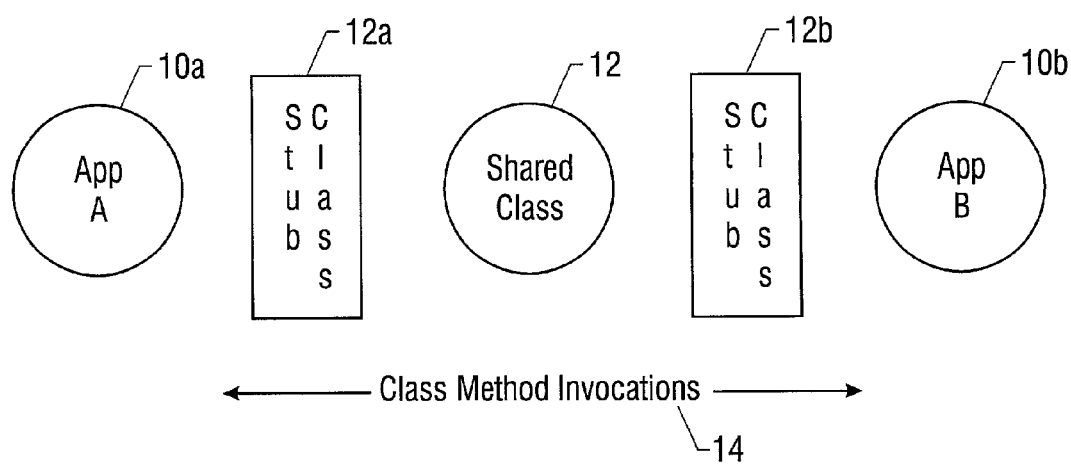
FIG. 1 is a schematic depiction of one embodiment of the present invention.

Referring to FIG. 1, a pair of application programs 10a and 10b running on the same or different processor-based systems may communicate with one another through stub classes 12a and 12b. The stub classes 12a and 12b provide an interface between each application 10 and a shared class 12. The stub classes 12a and 12b hide the fact that the class 12 actually being used is shared between two or more applications 10.

In some embodiments, the applications 10a and 10b may run on the same processor-based system. In another embodiment of the present invention, each application may run on a different processor-based system and those processor-based systems may be coupled together in a network.

The stub classes 12a and 12b then provide the glue that enables the applications 10 to share the same class 12 in a transparent or seamless fashion as seen by each application 10. The class method invocations may be invoked by either application 10 to instantiate a shared class object.

To share the class 12, the applications 10 may use a backing storage that comes from shared memory. Commonly, backing storage is allocated out of a program's default memory. As examples, backing storage may be allocated out of the program's global memory pool or out of stack memory. However, neither of these methods enable the backing storage for the class to be shared.

Figure 2:
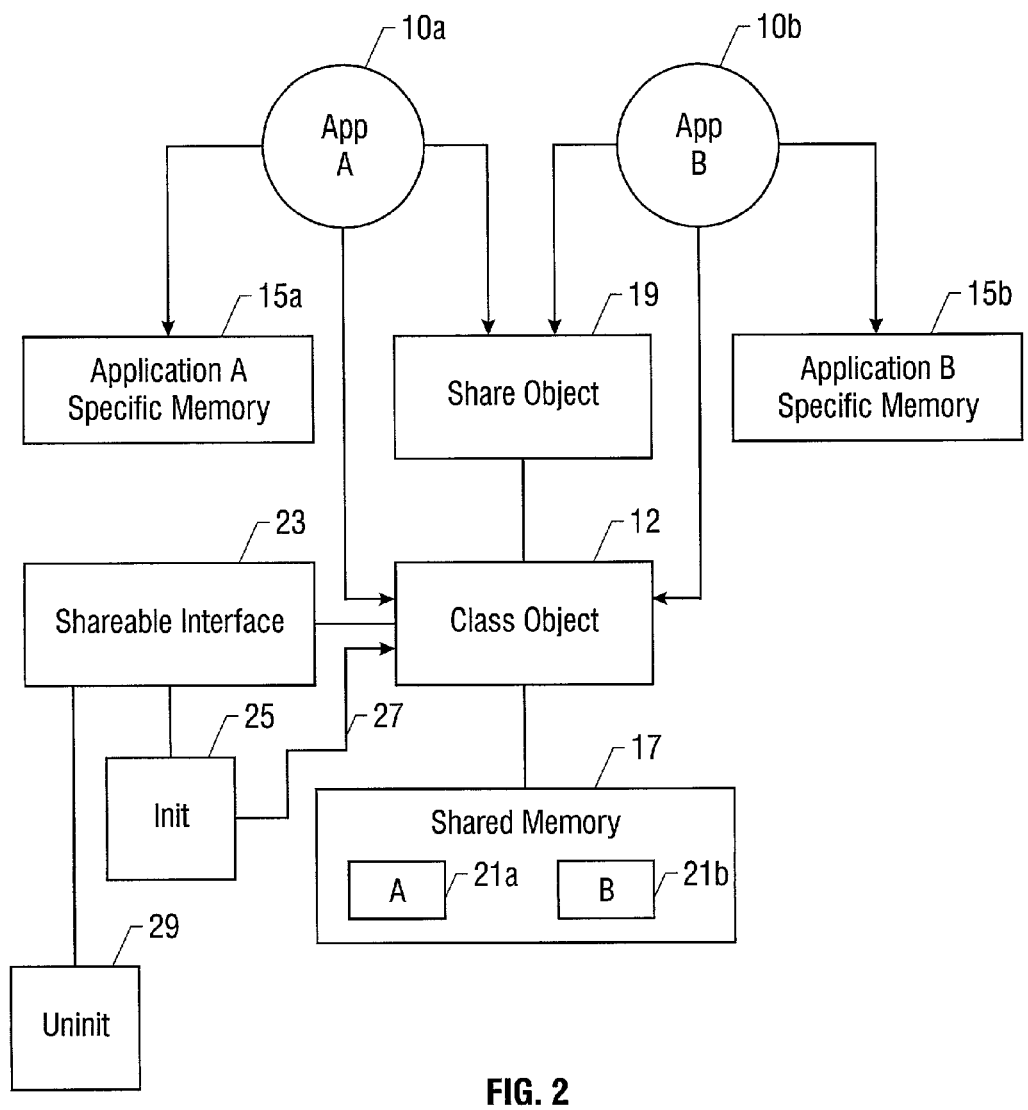
FIG. 2 is a more detailed schematic depiction of the embodiment shown in FIG. 1.

To provide shared memory, using the C++ programming language, the placement new operator may be utilized in one embodiment. The placement new operator allows one to specify the memory that is used as backing storage for any class objects that may be created:

Class*object=new(memory) Class;

Thus, the above code demonstrates one way to use the placement new operator to specify that the backing storage comes out of shared memory. Since the class object is to be shared, only one object may be instantiated and that object may then be shared. The mechanics of object execution can be encapsulated into a class that is used instantiate shareable objects. This encapsulation simplifies usage and can be used to guarantee that only a single instance is created. Referring to FIG. 2, this class object is the share object 19. The share object 19 sets up the shared memory, for example, using services provided by the operating system. The share object 19 also instantiates the class to be shared out of shared memory 17. Since the share object 19 is independent of the type of class to share, this information is provided to the share object 19 at compile time as a parameterized type using C++ templates.

For example, the share object 19 may instantiate an arbitrary class to share:

Share<Class> share;

Class*object=share.instance( );

Thus, each application program 10a and 10b may have an application specific memory 15a or 15b and may also utilize the shared memory 17. However, the shared memory 17 may include application specific portions 21a and 21b. Thus, object defined memory data that is program specific may be duplicated in the portions 21a and 21b of shared memory 17 allocated to each application 10a or 10b.

A member is a variable or routine that is part of a class. A structure relates to the way data is organized in a storage. Using structure, one can refer to stored data locations without needing memory offsets. Instead, a symbolic reference to memory locations in the structure may be used. Thus, the structure may include a system in which data associated with certain variables is located at known locations or offsets within the storage.

In some object oriented programs, the structure may also include a function. When the function is called within the structure, the function may go out and access the needed data. Thus, member data may include the data stored in the structure as well as functions stored in the structure.

When a function within a structure is called, the appropriate data is recalled. The member data is commonly private to one application and, from outside the structure, member data may not be accessible by any application except the application responsible for that data. In effect, the structure encapsulates the data and gives it a well defined interface for getting and setting the data in the structure. At the same time, this organization decouples the actual layout of the memory from external view. The structure may correspond to a class and the functions that are part of the structure or class may be called methods or functions of the class.

Thus, referring to FIG. 2, the share object 19 creates the class object 12 which is shared by the applications 10a and 10b. The shared memory 17 is used by both applications 10a and 10b. Thus, each application 10a and 10b may have member data in the class object 12 and this data is specific to one application's address space. It would then normally be illegal for one application 10 to use that member data from another application's address space. In operating systems, when an application is started, the operating system assigns virtual address space to the application. An application may use a specific pointer to access the application's own address space. If another application attempts to use the pointer to access that data, the pointer is no longer valid. This is because each application has a different assigned virtual address space.

This creates a problem in having the two applications 10 share a class out of shared memory 17. While an object can be shared out of shared memory, the member data associated with the object may be specific to the address space of one of the application 10a or 10b. Therefore the other application 10a or 10b may be unable to access it.

This problem may be overcome by automatically duplicating member data in each address space 21 associated with each application 10. Before a class object 12 is used, the share object 19 is created. Before each application 10 uses the share object 19, it calls an INIT method 25. The INIT method 25 creates the object INIT that makes sure that pointers to any member data specific to one application 10 is duplicated in the shared memory 12 associated with the other application 10. When the pointers and the associated data are duplicated, the INIT method 25 returns a pointer or handle to each application 10.

When an application 10 calls any other methods on the object 12, the application 10 uses that pointer or handle 27 to look up the correct application specific pointers. As a result, each application 10a and 10b has its own handle 27 to get to its own member data out of shared memory 17. All member data is accessible to both applications 10 because that member data (or at least pointers to it) are automatically duplicated.

It is desirable that each application 10 not be aware of specific member data in the class object 19 to be shared. Thus, the sharable class object 12 provides an Init method 25 that is invoked to perform this duplication. The shareable class object 12 implements a shareable interface 23 and thereby exposes methods of its own as well as those defined by the shareable interface 23, namely Init 25 and Unit 29. Prior to using the object 12, the applications A and B invoke the shareable interface 23 and Init method 25. Inside the method 25, the object duplicates any process specific data and returns a handle to the process or application 10 as indicated at 27.

The handle is then provided back to the object 12 in method invocations. The object 12 then uses the handle to resolve to the appropriate process specific member data:

void*handle=object→Init ( );

object→method(handle, . . . );

In some embodiments of the present invention, a shared class may be utilized by two different applications using backing storage for the shared class in shared memory. However, all object defined member data which is process specific may be duplicated in the address space of all applicable processes in one embodiment.

Figure 3:
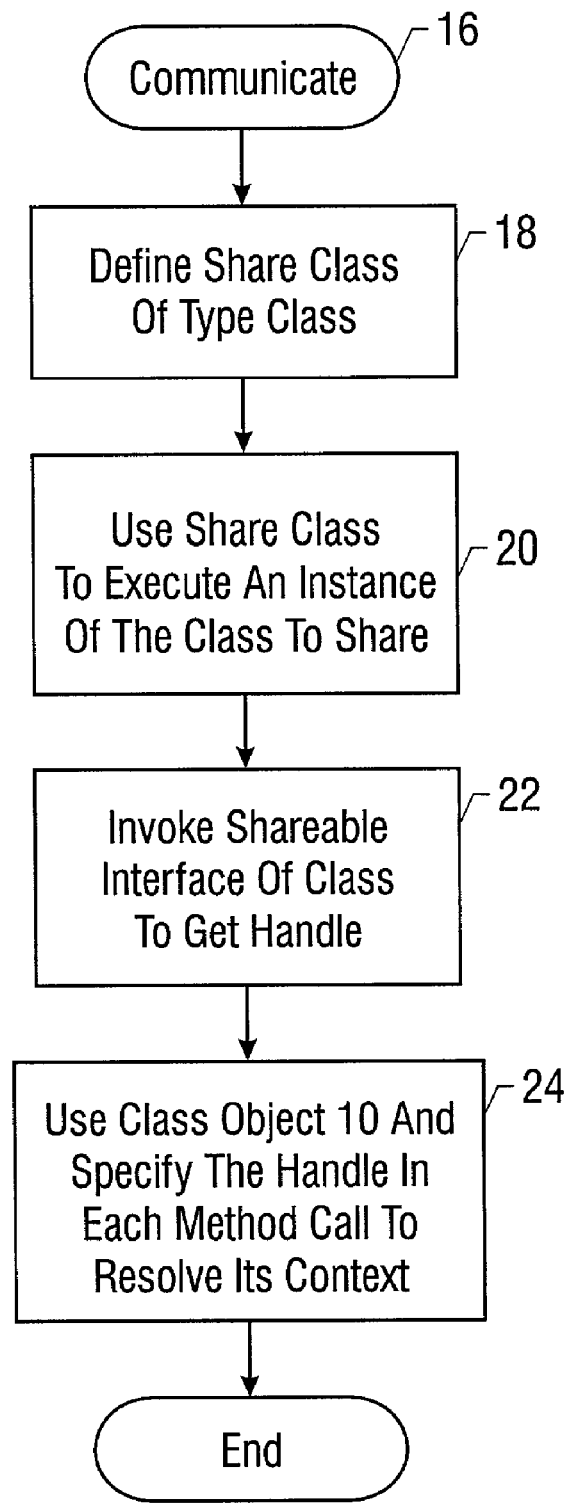
FIG. 3 is a flow chart for software for implementing the embodiment shown in FIG. 2.

Referring to FIG. 3, the software 16, that may be stored on each processor-based system that shares classes, may begin by defining a share class that includes the object 19 of the type class that includes the object 12 as indicated in block 18 (share <class> share). Using the share class, an instance of the class to share is executed, as indicated in block 20 (class*object=share.instance ( )). The shareable interface 23 of the class 12 is invoked to get an application specific handle ("context") 25, as indicated in block 20 (void*handle=object→Init( )). An application then uses the class object 12 as normal but specifies a handle in each method call to resolve its specific context, as indicated in block 24, (object→method (handle, . . . )). In some cases, this handle manipulation may be hidden in a stub or glue wrapper class.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   running at least two applications;
   enabling the applications to share a class;
   enabling each application to define an address space of a shared memory specific to each application; and
   duplicating member data for said class for each application in the address space of said shared memory specific to each application.

2. The method of claim 1 including enabling each application to use a shared memory.

3. The method of claim 1 including duplicating process specific data for each application.

4. The method of claim 3 including automatically duplicating process specific data in address space specific to each application.

5. The method of claim 1 including defining a share class and using the share class to execute an instance of a class to share.

6. The method of claim 5 including invoicing a sharable interface to obtain a handle.

7. The method of claim 6 including specifying the handle on each method call to resolve the context of the handle.

8. An article comprising a medium storing instructions executed, by a processor-based system to:
   run at least two applications;
   enable the applications to share a class;
   enable each application to define an address space of a shared memory specific to each application; and
   duplicate member data for said class for each application in the address space of said shared memory specific to each application.

9. The article of claim 8 further storing instructions that enable a processor-based system to enable each application to use a shared memory.

10. The article of claim 8 further storing instructions that enable the processor-based system to duplicate process specific data for each application.

11. The article of claim 10 further storing instructions tat enable the processor-based system to automatically duplicate process specific data in address space specific to each application.

12. The article of claim 8 further staring instructions that enable a processor-based system to define a share class and to use the share class to execute an instance of the class to share.

13. The article of claim 12 further storing instructions that enable the processor-based system to invoke a shareable interface to obtain a handle.

14. The article of claim 13 further storing instructions that enable the processor-based system to specify the handle on each method called to resolve the context of the handle.

15. A system comprising:
- a processor; and
- a storage coupled to said processor, said storage storing instructions executed, by the processor to run at least two applications, enable each application to share a class, enable each application to define an address space of a shared memory specific to each application, and duplicate member data for said class for each application in the address space of said shared memory specific to each application.

16. The system of claim 15 wherein said storage stores instructions that enable the processor to enable each application to use a shared memory.

17. The system of claim 15 wherein said storage stores instructions that enable the processor to duplicate process specific data for each application.

* * * * *

UNITED STATES PATENT AND TRADEMARK OFFICE
CERTIFICATE OF CORRECTION

| | | |
|---|---|---|
| PATENT NO. | : 7,246,135 B2 | Page 1 of 1 |
| APPLICATION NO. | : 09/756579 | |
| DATED | : July 17, 2007 | |
| INVENTOR(S) | : John L. Reid | |

It is certified that error appears in the above-identified patent and that said Letters Patent is hereby corrected as shown below:

<u>Column 4</u>:
Line 40, "invoicing" should be --invoking--;
Line 60, "tat" should be --that--;
Line 64, "staring" should be --storing--.

Signed and Sealed this

Eleventh Day of September, 2007

JON W. DUDAS
*Director of the United States Patent and Trademark Office*